(12) United States Patent
Kim et al.

(10) Patent No.: US 11,505,182 B2
(45) Date of Patent: Nov. 22, 2022

(54) VEHICLE AND CONTROL METHOD THEREOF

(71) Applicants: Hyundai Motor Company, Seoul (KR); Kia Motors Corporation, Seoul (KR)

(72) Inventors: Ilhwan Kim, Hwaseong-si (KR); Hong Gi Park, Seoul (KR); Seunghyun Kim, Seoul (KR); Donghyuk Kim, Hwaseong-si (KR); Kyung-joo Bang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 204 days.

(21) Appl. No.: 16/673,102

(22) Filed: Nov. 4, 2019

(65) Prior Publication Data
US 2020/0391730 A1 Dec. 17, 2020

(30) Foreign Application Priority Data

Jun. 17, 2019 (KR) .................. 10-2019-0071496

(51) Int. Cl.
*B60W 30/09* (2012.01)
*B60W 30/095* (2012.01)
*B60W 50/14* (2020.01)

(52) U.S. Cl.
CPC ........ *B60W 30/09* (2013.01); *B60W 30/0956* (2013.01); *B60W 50/14* (2013.01); *B60W 2050/146* (2013.01); *B60W 2554/00* (2020.02); *B60W 2556/45* (2020.02)

(58) Field of Classification Search
CPC .. B60W 30/09; B60W 30/0956; B60W 50/14; B60W 2554/00; B60W 2556/45; B60W 2050/146
See application file for complete search history.

(56) References Cited

U.S. PATENT DOCUMENTS 9,791,864 B2 * 10/2017 Lei ..................... G05D 1/0214
2012/0109610 A1 * 5/2012 Anderson ......... B60W 50/0098
703/7
2014/0236414 A1 * 8/2014 Droz ..................... G08G 1/166
701/28

(Continued)

OTHER PUBLICATIONS

"Collision avoidance system", https://web.archive.org/web/20181009041016/https://en.wikipedia.org/wiki/Collision_avoidance_system, pp. 1-16 (Year: 2018).*

*Primary Examiner* — Peter D Nolan
*Assistant Examiner* — Tanya C Sienko
(74) *Attorney, Agent, or Firm* — Morgan, Lewis & Bockius LLP

(57) ABSTRACT

A vehicle includes a communication device configured to request a neighboring vehicle for first data related to autonomous driving of the neighboring vehicle and to receive the first data from the neighboring vehicle while the vehicle is driving; a sensor device configured to sense second data regarding a state of a user of the vehicle and to detect third data regarding driving information of the neighboring vehicle; and a controller configured to classify risks of the vehicle into classes according to a preset criterion based on the first data, the second data, and the third data, and to score the risks based on the classified classes.

12 Claims, 7 Drawing Sheets

(56) References Cited

U.S. PATENT DOCUMENTS

| | | | |
|---|---|---|---|
| 2016/0207530 A1* | 7/2016 | Stanek | B60W 30/09 |
| 2017/0344023 A1* | 11/2017 | Laubinger | G08G 1/22 |
| 2018/0208195 A1* | 7/2018 | Hutcheson | B60W 50/14 |
| 2019/0035279 A1* | 1/2019 | Tang | G08G 1/0965 |
| 2019/0038204 A1* | 2/2019 | Beck | A61B 5/18 |
| 2019/0047559 A1* | 2/2019 | Conde | H04W 4/38 |
| 2019/0079659 A1* | 3/2019 | Adenwala | H04W 4/21 |
| 2020/0001839 A1* | 1/2020 | Lee | B60T 8/17558 |
| 2020/0079382 A1* | 3/2020 | Boulton | B60W 40/04 |
| 2020/0342756 A1* | 10/2020 | MacKenzie | G08G 1/16 |

\* cited by examiner

VEHICLE AND CONTROL METHOD THEREOF

CROSS REFERENCE TO RELATED APPLICATION

The present application is based on and claims the benefit of priority to Korean Patent Application No. 10-2019-0071496, filed on Jun. 17, 2019 in the Korean Intellectual Property Office, the entire disclosure of which is incorporated herein by reference.

TECHNICAL FIELD

The present disclosure relates to a vehicle traveling autonomously based on inter-vehicle communication, a vehicle equipped with a driver assistance system, and a control method thereof.

BACKGROUND

With recent developments of autonomous vehicles and driver assistance systems, technologies for measuring risks of a running vehicle are being developed. A conventional method for measuring the risks of a vehicle may include, for example, detecting the surrounding environment of the vehicle through sensors provided in the vehicle, detecting a state of a user in the vehicle, or determining the risk of the vehicle individually.

On the other hand, as the autonomous vehicles have become popular, technologies for acquiring information about surroundings through communication between vehicles are being developed. Sometimes, the acquired information about surroundings may include threatening factors to the running vehicle. The information may include not only fixed factors but also non-fixed factors such as other moving vehicles.

Therefore, there is a need to develop a technology for a running vehicle to measure the risk by using inter-vehicle communication to collect information of surrounding vehicles, and by combining information of the running vehicle and the collected information of the surrounding vehicles.

The information included in this Background section is only for enhancement of understanding of the general background of the present disclosure and may not be taken as an acknowledgement or any form of suggestion that this information forms the prior art already known to a person skilled in the art.

SUMMARY

The present disclosure provides a vehicle and control method thereof, capable of performing inter-vehicle communication with surrounding vehicles and scoring the risk of the vehicle based on a combination of information on a state of a user in the vehicle and a surrounding condition of the vehicle.

The present disclosure also provides a vehicle and control method thereof, capable of warning the user when the vehicle is in the danger area and pulling the vehicle out of the danger area based on the score.

In accordance with an aspect of the present disclosure, a vehicle may include a communication device for requesting the peripheral vehicle for first data related to an autonomous travel of a peripheral vehicle and receiving the first data from the peripheral vehicle while the vehicle is traveling; a sensor device for sensing second data on the state of the user of the vehicle and sensing third data on the traveling information of the surrounding vehicle; and a controller for classifying the degree of risk of the vehicle into a class according to a predetermined criterion based on the first data, the second data and the third data, and scoring the risk based on the classified class.

The controller comprising the first data includes information on whether the vehicle has at least one of a highway driving assistance function, a lane keeping assistance function, a smart cruise function, and an automatic emergency braking function of the surrounding vehicle.

The controller may be further configured to alert the user based on the second data.

The controller may be configured to determine at least one of a relative velocity of the peripheral vehicle or a relative distance to the peripheral vehicle from the vehicle based on the third data, and to predict an expected path of the peripheral vehicle to score a risk of the vehicle.

The controller may be further configured to compare the risk of the vehicle with a preset value and determining whether the vehicle is in a safety zone, a warning zone, or a dangerous zone based on a preset criterion based on a comparison result from comparing the risk of the vehicle with the preset value.

The vehicle may further include at least one of a steering device or an acceleration/deceleration device, wherein the controller controls the steering device or the acceleration/deceleration device such that the vehicle leaves a dangerous area based on a determination result from determining whether the vehicle is in the safety zone, the warning zone, or the dangerous zone and based on the state of the user.

The vehicle may include a display indicating the risk of the vehicle; and further comprising a warning device configured to warn the user of the vehicle based on the risk and the controller further includes controls the display and the warning device to display a danger area through the display to the user of the vehicle based on a scoring result from scoring the risk based on the classified class and to warn through the warning device.

The controller may be further configured to control the display to display to induce a user of the vehicle to drive to the safe area based on the scoring result.

In accordance with another aspect of the present disclosure, a control method of a vehicle includes requesting the peripheral vehicle for first data related to autonomous driving of the peripheral vehicle and receiving the first data from the peripheral vehicle while driving by communication device; detecting second data relating to a state of a user of the vehicle and detecting third data about driving information of the surrounding vehicle by sensor device; and classifying, by a controller, the degree of risk of the vehicle into a class according to a first preset criterion based on the first data, the second data, and the third data, and scoring the risk based on the classified class.

The control method may further include wherein the first data is a control method of a vehicle including information on whether at least one of the highway driving assistance function, lane keeping assistance function, smart cruise function, automatic emergency braking function of the surrounding vehicle.

The control method may further include alerting the user based on the second data.

The control method may further include determining at least one of a relative velocity of the peripheral vehicle or a relative distance to the peripheral vehicle from the vehicle based on the third data; and predicting a predicted path of the surrounding vehicle to score a risk of the vehicle.

The control method may further include comparing the risk of the vehicle with a preset value and determining whether the vehicle is in a safety zone, a warning zone, or a dangerous zone based on a preset criterion based on a comparison result from the comparing the risk of the vehicle with a preset value.

The control method may further include controlling the vehicle to leave the dangerous area based on a determination result from the determining whether the vehicle is in a safety zone, a warning zone, or a dangerous zone and based on the state of the user.

The control method may further include displaying a risk of the vehicle; warning the user of the vehicle based on the risk; the controller controls to display and warn the danger zone to the user of the vehicle based on a scoring result from the scoring the risk based on the classified class.

The control method may further include indicating to induce the user of the vehicle to travel to the safety area based on the scoring result.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
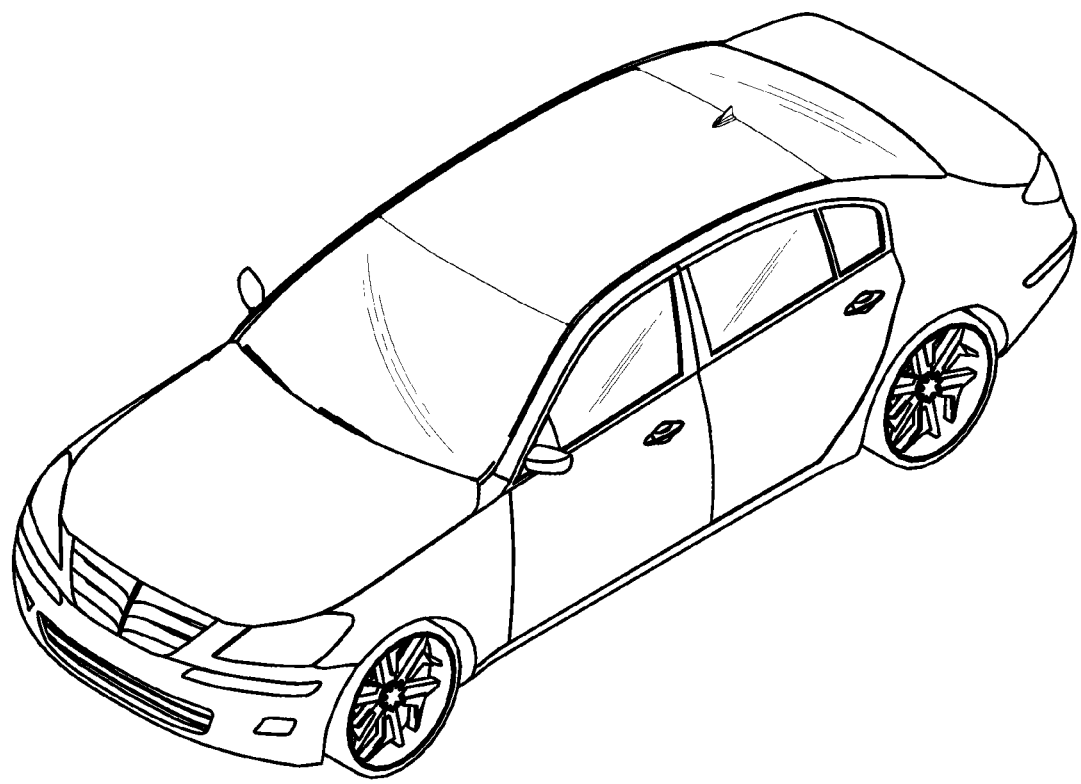
FIG. 1 shows a vehicle, according to an exemplary embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that the present disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Configuration of a vehicle 1 according to an exemplary embodiment of the present disclosure will be described with reference to FIGS. 1 and 2.

Figure 2:
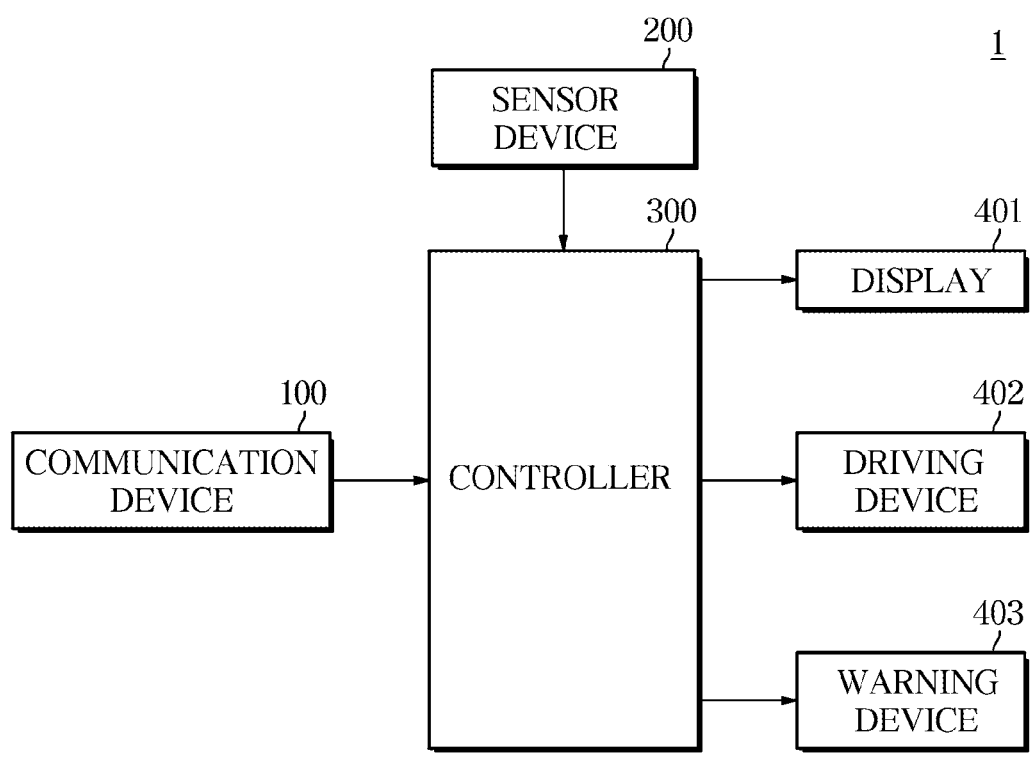
FIG. 2 is a control block diagram of a vehicle, according to an exemplary embodiment of the present disclosure.

Referring to FIGS. 1 and 2, the vehicle 1 includes a communication device 100, a sensor device 200, and a controller 300, and may further include a display 401, a driving device 402 or a warning device 403.

Specifically, the communication device 100 is provided in the vehicle 1 to enable communication between vehicles (inter-vehicle communication). The communication device 100 may transmit a signal requesting a neighboring vehicle for first data. The communication device 100 may also receive the first data from the neighboring vehicle.

The first data includes information relating to an autonomous driving function and information relating to an advanced driver assistance system (ADAS) of the neighboring vehicle to the vehicle 1.

Driver assistant functions constituting the ADAS include Highway Driving Assist (HDA), Lane Following Assist (LFA), Smart Cruise Control (SCC) and a Forward Collision Avoidance (FCA), but are not limited thereto. For example, the driver assistance functions may include other driver assistance functions constituting the advanced driver assistance system.

The communication module 100 may be a hardware device implemented by various electronic circuits, e.g., processor, to transmit and receive signals via wireless or wired connections. The communication device 100 may include one or more components that enable communication with external devices, e.g., at least one of a short-range communication module, a wired communication module, or a wireless communication module.

The short-range communication module may include various short-range communication modules to transmit or receive signals over a wireless communication network, such as a Bluetooth module, an infrared communication module, a Radio Frequency Identification (RFID) communication module, a Wireless Local Access Network (WLAN communication module, a Near Field Communication (NFC) module, or a Zigbee communication module.

The wired communication module may include not only various wired communication modules such as a Controller Area Network (CAN) communication module, a local area network (LAN) module, a wide area network (WAN) module, or a value added network Communication module, but also various cable communication modules such as a Universal Serial Bus (USB), a High Definition Multimedia Interface (HDMI), a Digital Visual Interface (DVI), a recommended standard 232 (RS-232), a power line communication or Plain Old Telephone Service (POTS) Modules.

The wireless communication module may include a Wi-Fi module, a wireless broadband (Wibro) module, and other various wireless communication modules that support Global System for Mobile Communication (GSM), Code Division Multiple Access (CDMA), Wideband Code Division Multiple Access (WCDMA), Time Division Multiple Access (TDMA), Long Term Evolution (LTE), or the like.

The wireless communication module may include a wireless communication interface including an antenna and a transmitter for transmitting signals related to vehicle information. The wireless communication module may further include a signal conversion module for converting a digital control signal output from a controller through the wireless communication interface to an analog wireless signal under the control of the controller.

The wireless communication module may include a wireless communication interface including an antenna and a receiver for receiving signals related to vehicle information. The wireless communication module may further include a signal conversion module for converting an analog wireless signal received through the wireless communication interface to a digital control signal under the control of the controller.

The sensor device 200 may include one or more sensors detecting second data and third data.

Specifically, the second data may be information relating to a state of a user in the vehicle 1. Hence, a sensor for detecting the second data may be provided on e.g., a steering wheel or a seat in the vehicle 1.

In an exemplary embodiment of the present disclosure, the sensor for detecting the second data may be a part of a Driver Attention Warning (DAW). In this case, the second data may include a level of accumulated tiredness of the user, whether the user drives while drowsy, etc. The second data is not, however, limited thereto, and may include information on other states of the user.

The third data includes information on a surrounding condition of the vehicle 1. Specifically, the third data may include all information except the autonomous driving function of a neighboring vehicle to the vehicle 1.

The third data according to an exemplary embodiment of the present disclosure may include a relative speed of a neighboring vehicle to the vehicle 1, a relative distance between the vehicle 1 and the neighboring vehicle, and a predicted path of the neighboring vehicle. Hence, a sensor for sensing the third data may include a speed sensor, a light sensor, an ultrasonic sensor, or a laser sensor provided inside or outside the vehicle 1. However, the sensor for sensing the third data is not limited thereto, and may include other types of sensors.

The controller 300 of the vehicle 1 according to an exemplary embodiment of the present disclosure may be a processor (e.g., computer, microprocessor, CPU, ASIC, circuitry, logic circuits, etc.). The controller 300 may be implemented by a non-transitory memory storing, e.g., a program(s), software instructions reproducing algorithms, etc., which, when executed, controls operations of various components of the vehicle 1, and a processor configured to execute the program(s), software instructions reproducing algorithms, etc., thereby to perform various functions described hereinafter. Herein, the memory and the processor may be implemented as separate semiconductor circuits. Alternatively, the memory and the processor may be implemented as a single integrated semiconductor circuit. The processor may embody one or more processor(s).

The controller 300 scores the risk of the vehicle 1 based on the first data received by the communication device 100, the second data and the third data sensed by the sensor device 200, as will be described later.

Specifically, the controller 300 may control the display 401, the driving device 402, or the warning device 403 of the vehicle 1.

Each of the components shown in FIG. 2 refers to a software component and/or a hardware component such as a Field Programmable Gate Array (FPGA) and an Application Specific Integrated Circuit (ASIC).

Figure 3:
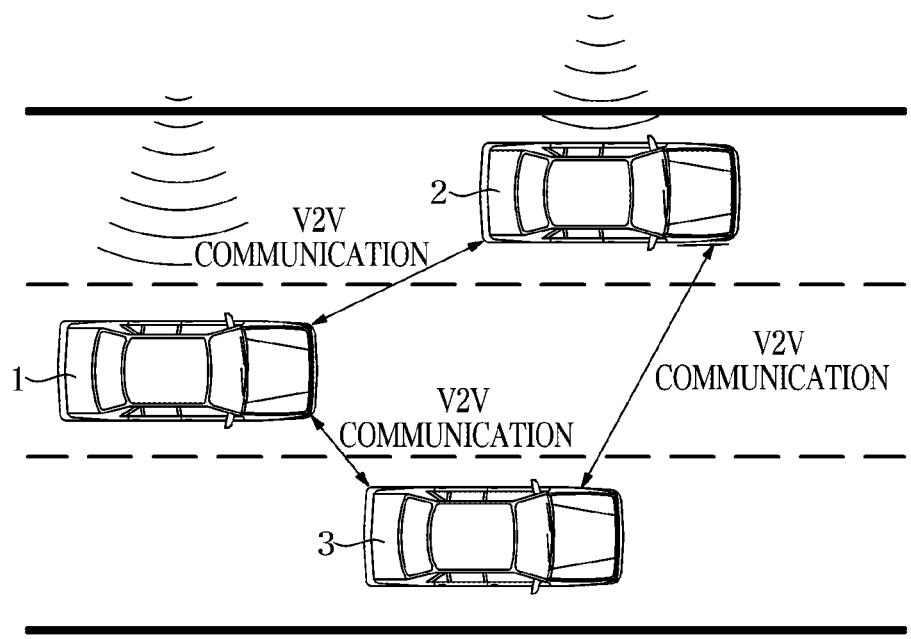
FIG. 3 shows a vehicle in communication with other vehicles, according to an exemplary embodiment of the present disclosure.

FIG. 3 shows the vehicle 1 communicating with other vehicles, according to an exemplary embodiment of the present disclosure.

Specifically, a method in which the vehicle 1 communicates with other vehicles may be a vehicle-to-vehicle (V2V) method. The vehicle 1 may prevent safety accidents by communicating with other vehicles in the V2V method. Meanwhile, an available V2V range for preventing the safety accident of the vehicle 1 may be set within a safety distance between the vehicle 1 and the neighboring vehicle.

Referring to FIG. 3, the vehicle 1 may receive information on a first neighboring vehicle 2 using V2V communication, and collect information about a second neighboring vehicle 3 when the first neighboring vehicle has already collected the information about the second neighboring vehicle 3. This enables the vehicle 1 to obtain information about as many neighboring vehicles as possible, and to score the risk more precisely by using the information of the surrounding vehicles.

The communication method is not, however, limited to the V2V method, and may further include communication between vehicle and road infrastructure (V2I: Vehicle to Infra), communication between vehicle and pedestrian (V2P: Vehicle to Pedestrian) to Nomadic Devices.

Figure 4:
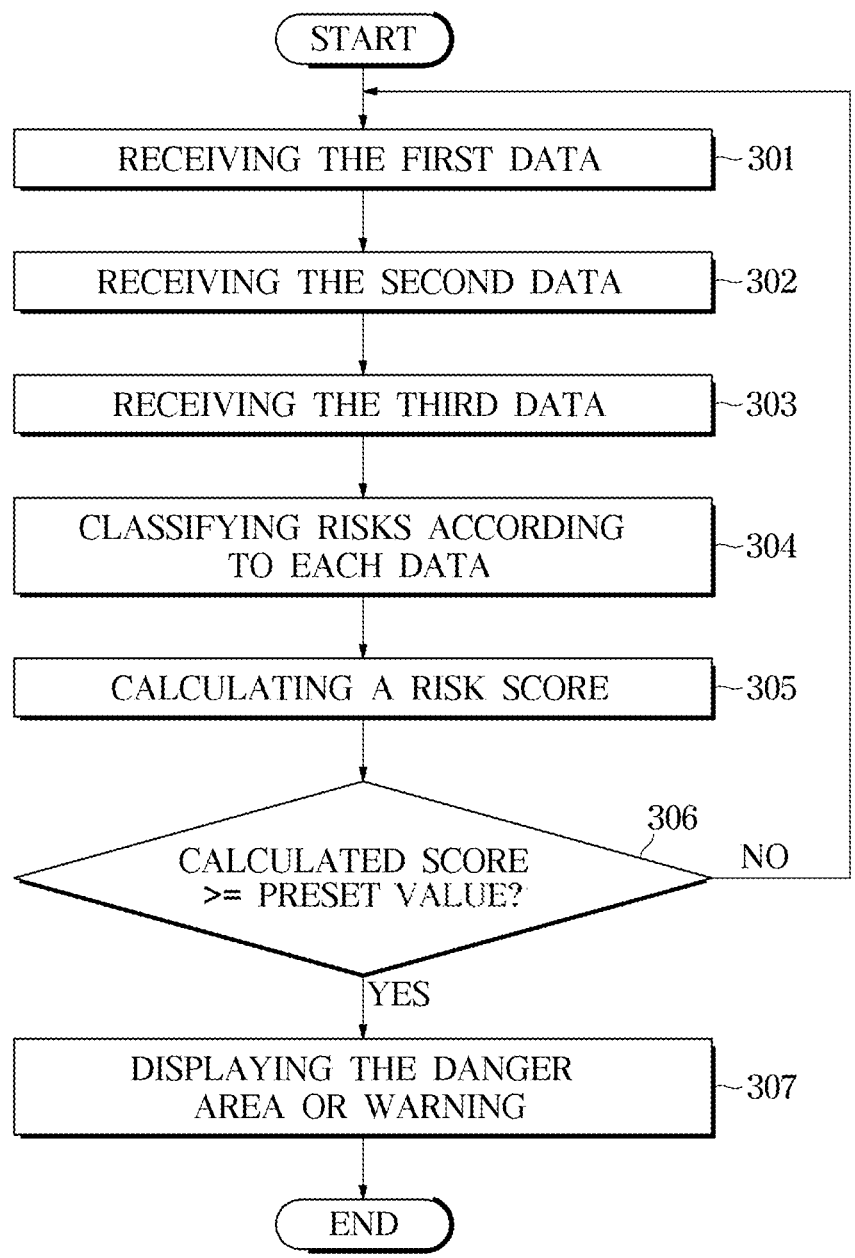
FIG. 4 is a flowchart illustrating a process of notifying a user of a vehicle of a danger area, according to an exemplary embodiment of the present disclosure.

FIG. 4 is a flowchart illustrating how the controller 300 scores the risk based on the first data, second data, and third data and informs the user of the vehicle 1 of a danger area.

Referring to FIG. 4, the communication device 100 of the vehicle 1 requests a neighboring vehicle for the first data related to the autonomous driving function and the driver assistance function of the neighboring vehicle, and acquires the first data from the neighboring vehicle. The communication device 100 sends the acquired first data to the controller 300, and the controller 300 receives the first data through the communication device 100 (step 301).

The sensor device 200 senses the second data related to a state of the user inside the vehicle 1 and the third data including driving information other than the first data. The sensor device 200 sends the second data and third data to the controller 300, and the controller receives the second data and the third data (step 302, step 303).

The controller 300 classifies risks according to each data based on the received first data, second data, and third data (step 304).

The controller 300 determines a risk score based on the classified risk (step 305).

Specific examples of classifying risks and determining a score of a risk will be described in detail later with reference to FIG. 5 and FIG. 6.

Still referring to FIG. 4, the controller 300 compares the determined score with a preset value. Specifically, in an exemplary embodiment of the present disclosure, when the score is equal to or greater than the preset value (step 306), the controller 300 determines that the vehicle 1 is in a danger area. Otherwise, when the determined score is less than the preset value (step 306), the controller 300 determines that the vehicle 1 is not in the danger area, and receives the first data, second data and third data again.

The controller 300 displays the danger area on the display 401 or gives a warning to the user through the warning device 403 (step 307) when the score of the vehicle risk determined on the basis of the first data, second data and third data is equal to or greater than the preset value.

Figure 5:
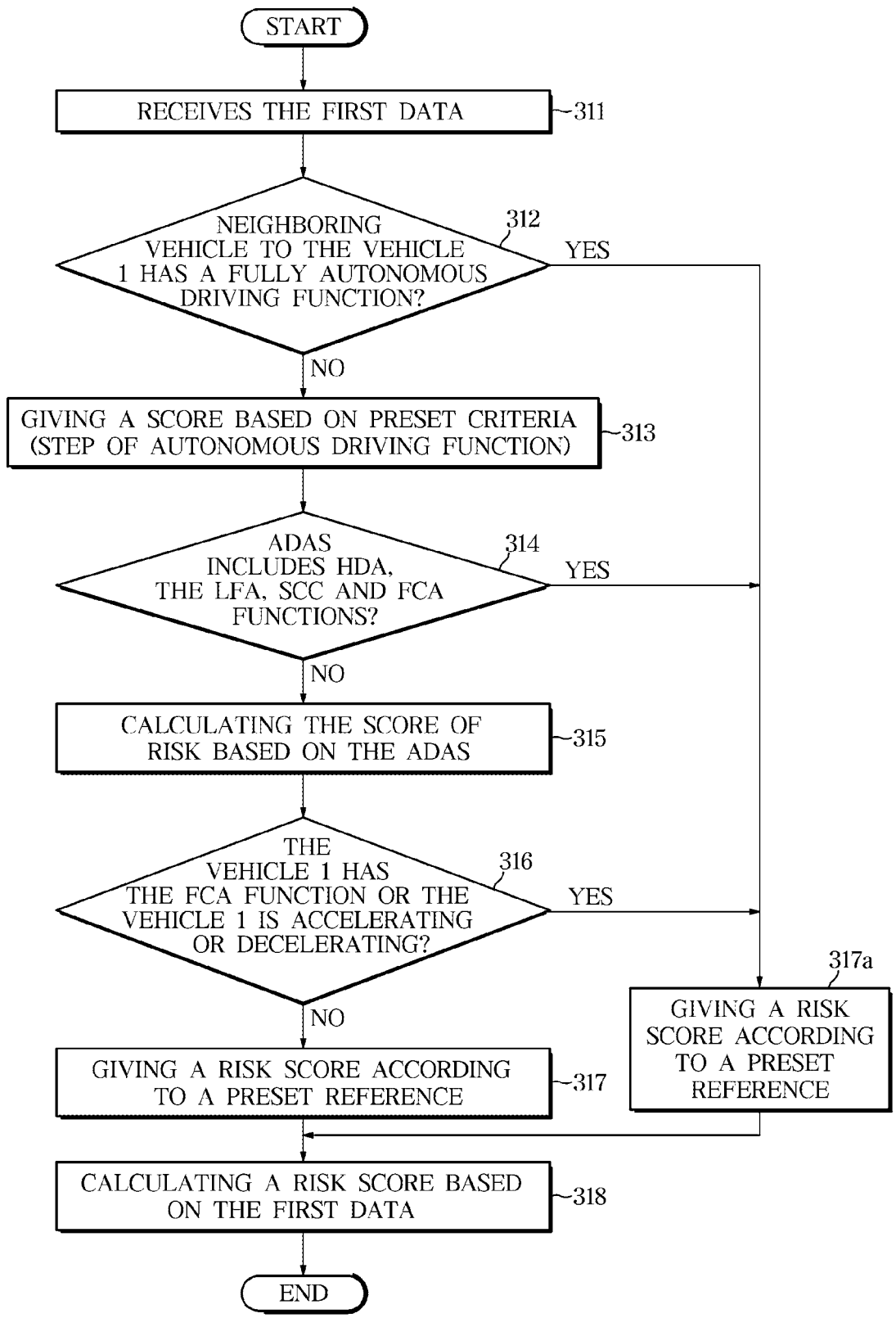
FIG. 5 is a flowchart illustrating a process of determining a score of a risk using first data of a vehicle, according to an exemplary embodiment of the present disclosure.

FIG. 5 is a flowchart illustrating a process of the controller 300 determining a score of the risk of the vehicle 1 based on the first data. The process in which the controller 300 determines a score of the risk of the vehicle 1 based on the first data will now be described.

The controller 300 receives the first data through the communication device 100 (step 311). The controller 300 then determines whether a neighboring vehicle to the vehicle 1 has a fully autonomous driving function (step 312). When the neighboring vehicle to the vehicle 1 has the fully autonomous driving function, the controller 300 gives a score based on an autonomous driving level of the neighboring vehicle (step 317a).

According to the type and degree of autonomous driving function provided by the vehicle around the vehicle 1, the risk is divided into five stages. Specifically, when the neighboring vehicle to the vehicle 1 is provided with a connected system and the neighboring vehicle is able to travel to the destination and park the vehicle 1 after arriving at the destination without the driver's intervention, the controller 300 classifies the autonomous driving of the neighboring vehicle as class 1 and gives a score of 1 point.

The score given to each class is set in advance, and the value of the score in the aforementioned case is merely an example. The score value may vary depending on the user's definition.

If the neighboring vehicle of vehicle 1 is not equipped with a fully autonomous driving function, the controller 300 determines a class of the autonomous driving based on the autonomous driving function of the neighboring vehicle and gives the determined class a score based on preset criteria (step 313). An example of a method of determining a risk score based on a criterion determined on the basis of the autonomous driving function of the neighboring vehicle of vehicle 1 according to an exemplary embodiment of the present disclosure will now be described.

According to an exemplary embodiment of the present disclosure, the autonomous driving class of another vehicle classified by the first data may be represented by 1 to 5 classes. In this case, the case where the autonomous driving class is class 5, is omitted since the surrounding vehicles are fully autonomous driving vehicles as described above.

Class 1 of autonomous driving may be defined as a stage requiring driver's assistance.

Specifically, when the driver of the neighboring vehicle of vehicle 1 is assisted in steering, acceleration, and deceleration, the controller 300 determines the autonomous driving class of the neighboring vehicle as level 5 and gives the level 5 a score of 5 points.

When the neighboring vehicle of vehicle 1 is a fully manual vehicle, the controller 300 may give the level 5 a score of five points corresponding to fully manual driving.

Class 2 of autonomous driving may be defined as a stage where the neighboring vehicle of vehicle 1 does partially autonomous driving.

Specifically, when the neighboring vehicle of vehicle 1 has a combined function of an autonomous driving function and a smart cruise control system or a steering assist system, and is thus able to travel while keeping a distance to a car in front and maintaining a lane but the driver of the neighboring vehicle needs to watch the surrounding situation, the controller 300 classifies the autonomous driving of the neighboring vehicle as level 4 and gives 4 points to the level 4.

The autonomous driving class 3 may be defined as a stage in which the neighboring vehicle of vehicle 1 does conditional autonomous driving.

Specifically, when the neighboring vehicle of vehicle 1 is equipped with the ADAS and is thus able to autonomously travel in a certain zone, but the driver of the neighboring vehicle needs to prepare for an unexpected situation, the controller 300 classifies the autonomous driving of the neighboring vehicle as level 3 and gives a score of three points to the level 3.

The autonomous driving class 4 may be defined as a stage in which the neighboring vehicle of vehicle 1 performs advanced autonomous driving.

Specifically, when the neighboring vehicle of vehicle 1 is equipped with a Lidar system and is able to perform all safety control under a particular road condition, the controller 300 classifies the autonomous driving of the neighboring vehicle as level 2 and gives a score of two points to the level 2.

The score corresponding to each class is set in advance, and the aforementioned score values are merely an example. For example, the points of the score may vary depending on the user's definition.

The controller 300 determines the score of risk of the vehicle 1 based on the information of the autonomous driving function of a neighboring vehicle to the vehicle 1, and determines the score of risk of the vehicle 1 based on the ADAS (step 314, 315).

On the other hand, when the ADAS is not equipped in the neighboring vehicle of vehicle 1, the controller 300 gives a score based on a predetermined reference (step 317a).

A process of scoring risks by the controller 300 according to a reference set in advance based on the ADAS of the neighboring vehicle of vehicle 1 will now be described.

As described above, the ADAS includes HDA, the LFA, SCC and FCA functions. The driver assistance functions are not limited thereto, and may include other various driver assistance functions constituting the ADAS.

In an exemplary embodiment of the present disclosure, when the HDA is activated in the neighboring vehicle of vehicle 1, the controller 300 may issue five points to the neighboring vehicle. Otherwise, if the HDA is not activated in the neighboring vehicle of vehicle 1, the controller 300 may issue three points to the neighboring vehicle. When the neighboring vehicle of vehicle 1 is driven by fully autonomous driving, the controller 300 may issue zero point to the neighboring vehicle.

In an exemplary embodiment of the present disclosure, the LFA function of the neighboring vehicle of vehicle 1 may be set to one of three levels according to the range of an area that the neighboring vehicle may detect.

In an exemplary embodiment of the present disclosure, when the LFA function is at level 1, the controller 300 may give three points to the neighboring vehicle of vehicle 1; when at level 2, two points; and when at level 3, one point. In addition, when the neighboring vehicle of vehicle 1 performs fully autonomous driving, the controller 300 may give zero point to the neighboring vehicle because the neighboring vehicle that performs the fully autonomous driving constitutes the lowest risk to the vehicle 1. On the other hand, if the neighboring vehicle of vehicle 1 is not equipped with the LFA, the controller 300 may give the neighboring vehicle 5 points because the risk is the highest.

However, they are merely an example of predetermined scores, and score intervals, values, or weights may vary depending on the driver's preferences or the user's definitions.

According to an exemplary embodiment of the present disclosure, an SCC function may be set to one of modes 1 to 4 for a neighboring vehicle of vehicle 1.

Specifically, in accordance with an exemplary embodiment of the present disclosure, an SCC function of the neighboring vehicle is set to one of modes 1 to 4 according to the distance between the neighboring vehicle and a vehicle in front of the neighboring vehicle. It may be estimated that the lower the mode number, the shorter the distance between the neighboring vehicle of the preceding vehicle and the higher the risk. Accordingly, the controller 300 may allocated three points for mode 1 of the SCC, two points for mode 2 of the SCC, and one point for mode 3 or 4. In addition, when the neighboring vehicle of vehicle 1 performs complete autonomous driving, the controller 300 may estimate and give zero point to the score of the risk of the vehicle 1. On the other hand, when the SCC is not equipped in the neighboring vehicle of vehicle 1, the controller 300 determines that the vehicle 1 is in the most dangerous situation and gives 5 points to the vehicle 1 as the score of the risk.

However, it is merely an example of predetermined scores, and score intervals, score values or weights may vary depending on the driver's preferences or the user's definitions.

The controller 300 determines a risk score of the vehicle 1 according to the ADAS function of a neighboring vehicle of vehicle 1 and determines whether the vehicle 1 has the FCA function and whether the vehicle 1 is accelerating or decelerating (step 316).

When the controller 300 determines that the vehicle 1 has no FCA function and is not accelerating or decelerating, the controller 300 gives a risk score according to a preset reference (step 317a).

When the controller 300 determines that the vehicle 1 has the FAC and is accelerating or decelerating, the controller 300 gives a risk score according to predetermined criteria, based on whether the vehicle 1 has the FCA, whether the vehicle is accelerating or decelerating, and behavior of the neighboring vehicle of vehicle 1 (step 317).

Specifically, according to an exemplary embodiment of the present disclosure, the controller 300 may determine a risk level according to whether the vehicle 1 has an FCA and the behavior of the neighboring vehicle of vehicle 1.

Specifically, when the vehicle 1 is equipped with the FCA: Forward Collision Avoidance function and is accelerating, the controller 300 may give 4 points to an occasion when there is a preceding vehicle, and add extra 1 point when there is a vehicle behind the vehicle 1. In addition, when the vehicle 1 is equipped with the FCA function and is decelerating, the controller 300 may give 4 points to an occasion when there is a vehicle behind the vehicle 1, and add extra 1 point when there is a vehicle in front of the vehicle 1.

On the other hand, when the vehicle 1 is not equipped with the FCA function and is accelerating, the controller 300 may give five points for an occasion when there is a vehicle in front of the vehicle 1, and add extra 2 points when there is a vehicle behind the vehicle 1. Furthermore, when the vehicle 1 is not equipped with the FCA function and is decelerating, the controller 300 may give five points when there is a vehicle behind the vehicle 1, and add extra two points when there is a vehicle in front of the vehicle 1. However, this is merely an example of predetermined scores, and score intervals, score values or weights may vary depending on the driver's preferences or the user's definitions.

The controller 300 determines a risk score based on the first data, and determines a risk score according to the first data by summing all the determined scores (step 318).

Figure 6:
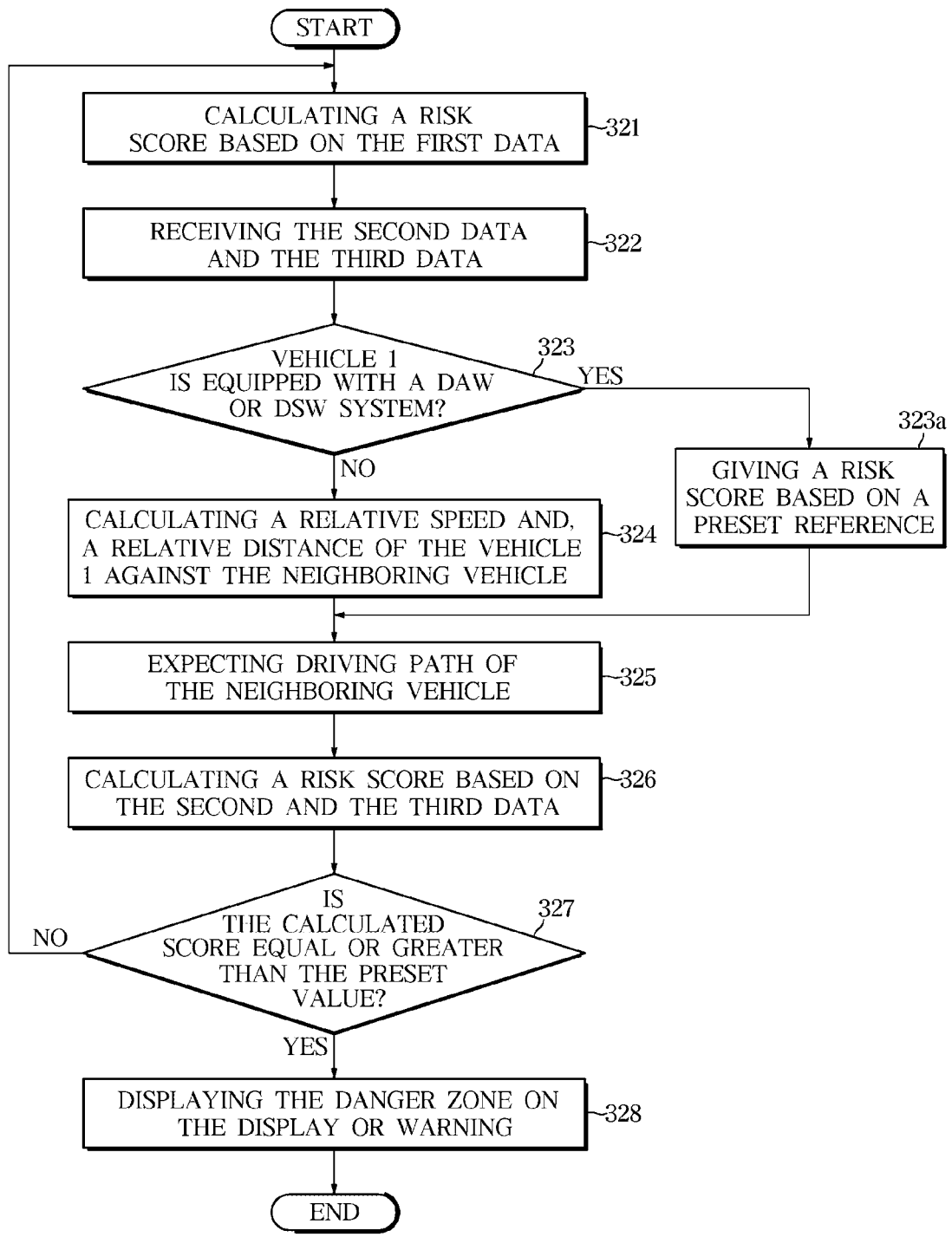
FIG. 6 is a flowchart illustrating a method of determining a score of a risk based on second data and third data of a vehicle, according to an exemplary embodiment of the present disclosure.

FIG. 6 is a flowchart illustrating a method of determining a risk score of the vehicle 1 based on the second data and the third data.

Referring to FIG. 6, the controller 300 determines a risk score according to the first data (step 321), receives the second data and the third data (step 322)

The controller 300 determines whether the vehicle 1 is equipped with a DAW or DSW system based on the second data (step 323).

When the vehicle 1 is equipped with the DAW or DSW system, the controller 300 allocates a risk score (step 323a) based on a preset reference.

Specifically, according to an exemplary embodiment of the present disclosure, the DAW or DSW system may basically classify risks into five levels based on non-stop driving time of the driver of the vehicle 1. For example, for 1 hour of driving time of the driver, the risk may be classified as level 1; for 2 hours of driving time, level 2; for 3 hours, level 3; for 4 hours, level 4; and for 5 hours, level 5.

In addition, the risk level based on the DAW or DSW system may be set by taking into account a change in lateral position of the vehicle 1, an extent to which the vehicle 1 violates the lane, a change in steering angle of the vehicle 1 in addition to the driving time of the driver of the vehicle 1.

Accordingly, according to an exemplary embodiment of the present disclosure, the controller 300 estimates and scores risks based on a state of the driver determined by the DAW or DSW system.

Specifically, according to an exemplary embodiment of the present disclosure, based on the DAW system, the controller 300 allocates 1 point for driver state 1; 1.5 points for driver state 2; 2 points for driver state 3; 2.5 points for driver state 4; and 10 points for driver state 5.

However, this is merely an example of predetermined scores, and score intervals, score values or weights may be changed depending on the driver's preferences or the user's definitions. In addition, the DAW system may be used in combination or interchangeably with the DSW system.

The controller 300 determines a risk score of the vehicle 1 according to the second data, and further determines a risk score of the vehicle 1 based on the third data (step 324, step 325, and step 326).

How the controller 300 determines the risk score based on the third data according to an exemplary embodiment of the present disclosure will now be described.

According to an exemplary embodiment of the present disclosure, the controller 300 may further determine the risk according to a relative speed of the vehicle 1 against the neighboring vehicle, a relative distance, or an expected driving path of the neighboring vehicle, and score the risk.

Specifically, according to an exemplary embodiment of the present disclosure, the controller 300 allocates zero point for relative speed of −10 kph or higher; 1 point for relative speed of −10 kph to −15 kph; 3 points for −15 kph to −20 kph; 5 points for −20 kph to −25 kph; 7 points for −25 kph to −30 kph; or 10 points for −30 kph or lower.

However, this is merely an example of predetermined scores, and the score intervals, score values or weights may be changed depending on the driver's preferences or the user's definitions.

According to an exemplary embodiment of the present disclosure, the controller 300 may allocate −2 points for relative distance of 100 m or longer between the vehicle 1 and the neighboring vehicle; −1 point for 100 m; 1 point for 80 m, 2.5 points for 60 m; 4 points for 40 m; or 5 points for 20 m.

However, this is merely an example of predetermined scores, and score intervals, score values or weights may be changed depending on the driver's preferences or the user's definitions.

According to an exemplary embodiment of the present disclosure, the controller 300 may allocate a risk score of the vehicle 1 ranging from 1 to 5 points according to the expected driving route of the neighboring vehicle of vehicle 1. Score intervals, score values or weights based on the expected driving route of the neighboring vehicle may vary depending on driver's preferences or the user's definitions.

As described above, when the controller 300 determines the risk score of the vehicle 1 based on the first data, the second data, and the third data, the controller 300 compares the determined score with a preset value (step 327). Specifically, according to an exemplary embodiment of the present disclosure, when the score is equal to or greater than the preset value, the controller 300 determines that the vehicle 1 is in a danger zone. Otherwise, when the determined score is less than the preset value, the controller 300 determines that the vehicle 1 is not in a danger zone, and receives the first data, the second data and the third data again.

The controller 300 displays the danger zone on the display 401 or warn the user of the vehicle 1 of the danger zone when the risk score of the vehicle 1 determined on the basis of the first data, the second data and the third data is equal to or greater than the preset value (step 328).

An example of a process of the controller 300 scoring the risk of the vehicle 1 in an assumed situation will now be described.

Specifically, according to an exemplary embodiment of the present disclosure, when the controller 300 determines that a neighboring vehicle of vehicle 1 is in a manual driving state as a result of analyzing the first data, the controller 300 allocates 5 points as a risk score of the vehicle 1, and when the HDA is not working in the neighboring vehicle, the controller 300 allocates 3 points as the risk score. According to an exemplary embodiment of the present disclosure, when the controller 300 analyzes the first data and determines that the neighboring vehicle of vehicle 1 is not equipped with the LFA function or the LFA function is deactivated, the controller 300 allocates five points as the risk score, and when the SCC function is in mode 3, the controller 300 allocates one point as the risk score. According to an exemplary embodiment of the present disclosure, when the controller 300 analyzes the first data and determines that the vehicle 1 is equipped with the FCA function and is decelerating and there is a preceding vehicle, the controller 300 additionally gives extra 1 point. The controller 300 determines a total risk score of the vehicle 1 by combining all the risk scores determined as described above. In this case, the total risk score of the vehicle 1 determined on the basis of the first data comes to 15 points.

In addition, according to an exemplary embodiment of the present disclosure, the controller 300 obtains a stage of a DAW system based on the driving time of the driver and driver state, sets a weight based on the stage of the DAW system, and multiplies the weight by the risk score determined based on the first data to obtain a risk score of the vehicle 1 based on the first data and the second data. For example, when the risk score of the vehicle 1 based on the first data in an assumed situation is 15 points and a stage of the DAW system is 4, the controller 300 determines the score of the DAW system to be 2.5, and multiplies the score as a weight by the risk score of the vehicle 1 based on the first data. Therefore, the risk score of the vehicle 1 based on the first data and the second data in the assumed situation is determined as 37.5 points.

In addition, according to an exemplary embodiment of the present disclosure, the controller 300 determines the final score by adding a score evaluated based on the third data to the risk score determined based on the first data and the second data. For example, with risk score based on the first data and the second data in a situation being 37.5 points when a relative speed of the vehicle 1 against the neighboring vehicle is −10 kph, the controller 300 allocates 0 point; and when a relative distance between the vehicle 1 and the neighboring vehicle is 80 m, the controller 300 allocates 1 point. Furthermore, when it is assumed that a risk score of the vehicle 1 based on an expected driving path of the neighboring vehicle is 2 points, the total risk score of the vehicle 1 comes to 40.5 points.

However, the disclosed exemplary embodiment is merely derived from an assumed situation, and there may be different environments depending on various driving environments of the vehicle 1, and there may also be other score determination methods depending on the user's definitions.

Figure 7:
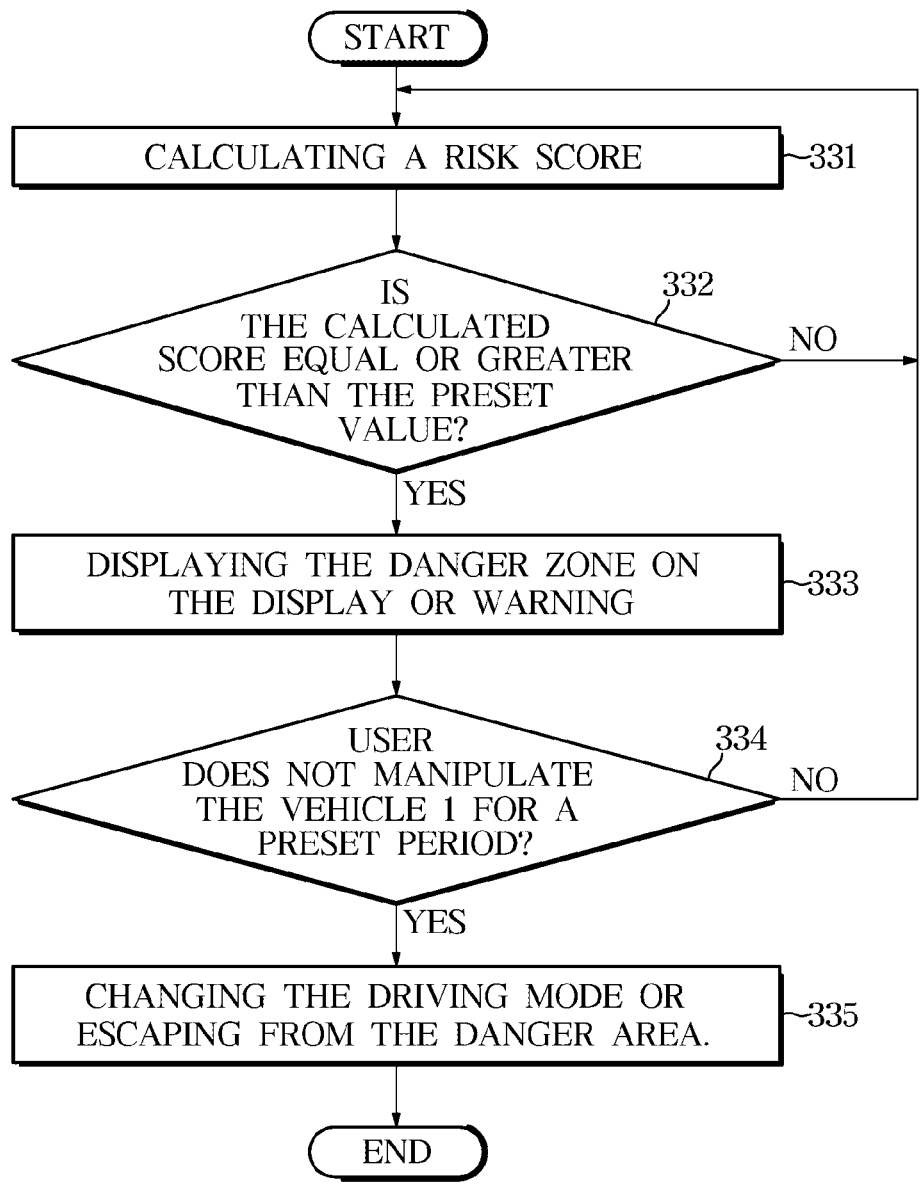
FIG. 7 is a flowchart illustrating a process of controlling a vehicle to escape from a danger area, according to an exemplary embodiment of the present disclosure.

FIG. 7 is a flowchart illustrating a process for the controller 300 to control a vehicle to escape from area danger area, according to an exemplary embodiment of the present disclosure.

Referring to FIG. 7, the controller 300 determines a risk score of the vehicle 1 as described above (step 331). When the determined risk score is greater than a predetermined value, the controller 300 displays the danger area on the display 401 or warns the user of the vehicle 1 of the danger area through the warning device 403 (step 332, step 333). Otherwise, when the determined risk score is less than the predetermined value, the controller 300 continues to evaluate the risk of the vehicle 1.

When the user is not manipulating the vehicle 1 for a preset period of time even after the controller 300 displays the danger area on the display 401 or warns the user of the danger area through the warning device 403, the controller 300 may change the driving mode of the vehicle 1 into the autonomous driving mode and controls driving device 402 for the vehicle 1 to escape from the danger area.

According to various embodiments of the present disclosure, inter-vehicle communication is used by a vehicle to score the risk of the vehicle by combining the state of the user inside the vehicle and information about the surroundings of the vehicle, determine whether the vehicle is in danger based on the risk score, thereby securing safety of the user.

Furthermore, the risk of the vehicle is evaluated as a score, and when it is determined that the vehicle is in danger based on the risk score, the vehicle may warn the user of the vehicle that the vehicle is in danger and performs autonomous driving to escape from the danger situation.

At least one component may be added or deleted to correspond to the capabilities of the system described in connection with FIGS. 1 to 7. It will be readily understood by those skilled in the art that the mutual position of the components of the system may be changed based on the performance or structure of the system.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

While the disclosure has been described above with respect to a limited number of embodiments, those skilled in the art, having the benefit of this disclosure, will appreciate that other embodiments may be devised which do not depart from the scope as disclosed herein. Accordingly, the scope should be limited only by the attached claims.

What is claimed is:

1. A vehicle comprising;
   a display;
   a communication device configured to request a neighboring vehicle for first data related to an existence of autonomous driving of the neighboring vehicle and a plurality of advanced driver assistance systems (ADAS) of the neighboring vehicle and to receive the first data from the neighboring vehicle while the vehicle is driving;
   a sensor device configured to sense second data regarding a state of a user of the vehicle and to detect third data regarding at least one of a relative velocity, a relative distance, and an expected driving path of the neighboring vehicle; and
   a controller configured to obtain a first score for the first data, a second score for the second data, and a third score for the third data, respectively, sum the obtained first, second, and third scores, and control the display to display a danger zone based on the summed score,
   wherein the first score is a score obtained by summing a score corresponding to a class of the autonomous driving of the neighboring vehicle, a score corresponding to whether or not the neighboring vehicle has a highway driving assistance function and the class of the autonomous driving of the neighboring vehicle, a score corresponding to a detection area of a lane keeping assistance function and the class of the autonomous driving of the neighboring vehicle, a score corresponding to the class of the autonomous driving of the neighboring vehicle and a degree of risk corresponding to the relative distance from the neighboring vehicle while performing the smart cruise function, and a score corresponding to the third data while performing an automatic emergency braking function, and
   wherein the third score is a score obtained by summing a score corresponding to a degree of risk for the relative velocity, a score corresponding to the degree of risk for the relative distance, and a score corresponding to a degree of risk for the expected driving path of the neighboring vehicle.

2. The vehicle according to claim 1, wherein the controller is further configured to give a warning to the user based on the second data.

3. The vehicle according to claim 1, wherein the controller is further configured to compare the summed score with a preset value, and to determine a surrounding zone of the vehicle as one of a safety zone, a warning zone, or the danger zone based on a comparison between the summed score and the preset value.

4. The vehicle according to claim 3, further comprising at least one of a steering device or an acceleration/deceleration device,
   wherein the controller is configured to control at least one of the steering device or the acceleration/deceleration device such that the vehicle escapes from the danger zone based on a determination result whether the vehicle is in at least one of the safety zone, the warning zone, or the danger zone and based on the state of the user.

5. The vehicle according to claim 3, further comprising:
   a warning device configured to warn the user of the vehicle,
   wherein the controller is configured to control the warning device to give a warning based on the summed score.

6. The vehicle according to claim 5,
   wherein the controller is configured to control the display to display a guidance for the user to drive the vehicle to the safety zone based on the summed score.

7. A control method of a vehicle, comprising:
   requesting a neighboring vehicle for first data related to an existence of autonomous driving of the neighboring vehicle and a plurality of advanced driver assistance systems (ADAS) of the neighboring vehicle, and receiving the first data from the neighboring vehicle;
   detecting second data related to a state of a user of the vehicle and detecting third data about at least one of a relative velocity, a relative distance, and an expected driving path of the neighboring vehicle;
   obtaining a first score for the first data, a second score for the second data, and a third score for the third data, respectively;
   summing the obtained first, second, and third scores; and
   controlling a display to display a danger zone based on the summed score,
   wherein the obtaining the first score includes: obtaining by summing a score corresponding to a class of the autonomous driving of the neighboring vehicle, a score corresponding to whether or not the neighboring vehicle has a highway driving assistance function and the class of the autonomous driving of the neighboring vehicle, a score corresponding to a detection area of a lane keeping assistance function and the class of the autonomous driving of the neighboring vehicle, a score corresponding to the class of the autonomous driving of the neighboring vehicle and a degree of risk corresponding to the relative distance from the neighboring vehicle while performing the smart cruise function, and score corresponding to the third data while performing an automatic emergency braking function, and wherein the obtaining the third score includes: obtaining by summing a score corresponding to a degree of risk for the relative velocity, a score corresponding to the degree of risk for the relative distance, and a score corresponding to a degree of risk for the expected driving path of the neighboring vehicle.

8. The method according to claim 7, further comprising warning the user based on the second data.

9. The method according to claim 7, further comprising comparing the summed score with a preset value, and determining a surrounding zone of the vehicle as a safety zone, a warning zone, or the danger zone based on a comparison between the summed score and the preset value.

10. The method according to claim 9, further comprising controlling the vehicle to escape from the danger zone based on a determination result from the determining whether the vehicle is in the safety zone, the warning zone, or the danger zone and based on the state of the user.

11. The method according to claim 9, further comprising:
warning the user of the vehicle based on the risk; and
warning the user of the danger zone based on the summed score.

12. The method according to claim 11, further comprising displaying a guidance for the user of the vehicle to drive the vehicle to the safety zone based on the summed score.

* * * * *